(12) United States Patent
Pan

(10) Patent No.: US 7,697,782 B2
(45) Date of Patent: Apr. 13, 2010

(54) SYSTEM FOR REDUCING RINGING ARTIFACTS

(75) Inventor: Hao Pan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1254 days.

(21) Appl. No.: 10/944,325

(22) Filed: Sep. 16, 2004

(65) Prior Publication Data

US 2006/0056723 A1  Mar. 16, 2006

(51) Int. Cl.
 *G06K 9/40* (2006.01)
(52) U.S. Cl. .................. 382/275; 382/260
(58) Field of Classification Search .......... 382/254, 382/264, 224, 275
See application file for complete search history.

(56) References Cited

U.S. PATENT DOCUMENTS

| | | | | |
|---|---|---|---|---|
| 4,860,373 A | * | 8/1989 | Hartless et al. | 382/268 |
| 4,969,203 A | * | 11/1990 | Herman | 382/266 |
| 5,229,864 A | * | 7/1993 | Moronaga et al. | 382/261 |
| 5,802,218 A | | 9/1998 | Brailean | |
| 5,818,964 A | * | 10/1998 | Itoh | 382/205 |
| 5,822,467 A | * | 10/1998 | Lopez et al. | 382/261 |
| 5,844,614 A | * | 12/1998 | Chong et al. | 375/240.24 |
| 5,850,294 A | * | 12/1998 | Apostolopoulos et al. | 358/426.14 |
| 5,852,475 A | * | 12/1998 | Gupta et al. | 348/606 |
| 5,883,983 A | * | 3/1999 | Lee et al. | 382/268 |
| 5,920,356 A | * | 7/1999 | Gupta et al. | 348/606 |
| 5,933,541 A | * | 8/1999 | Kutka et al. | 382/261 |
| 5,974,197 A | * | 10/1999 | Lee et al. | 382/268 |
| 6,167,164 A | * | 12/2000 | Lee | 382/261 |
| 6,226,050 B1 | * | 5/2001 | Lee | 348/607 |
| 6,227,050 B1 | | 5/2001 | Lee | |
| 6,236,763 B1 | | 5/2001 | Wong et al. | |
| 6,240,135 B1 | * | 5/2001 | Kim | 375/240.01 |
| 6,259,823 B1 | * | 7/2001 | Lee et al. | 382/268 |
| 6,360,024 B1 | * | 3/2002 | Tan et al. | 382/260 |
| 6,504,873 B1 | * | 1/2003 | Vahvilainen | 375/240.29 |
| 6,539,060 B1 | * | 3/2003 | Lee et al. | 375/240.29 |
| 6,611,608 B1 | * | 8/2003 | Wu et al. | 382/100 |
| 6,665,346 B1 | | 12/2003 | Lee et al. | |
| 6,920,252 B2 | * | 7/2005 | Rouvellou | 382/275 |
| 6,993,191 B2 | * | 1/2006 | Petrescu | 382/205 |
| 7,003,173 B2 | * | 2/2006 | Deshpande | 382/261 |
| 7,003,174 B2 | * | 2/2006 | Kryukov et al. | 382/266 |
| 7,426,315 B2 | * | 9/2008 | Frishman et al. | 382/268 |
| 7,440,635 B2 | * | 10/2008 | Tan et al. | 382/268 |
| 2002/0080882 A1 | | 6/2002 | Kitagawa | |

(Continued)

FOREIGN PATENT DOCUMENTS

EP  1209624  5/2002

(Continued)

OTHER PUBLICATIONS

Jarske, et al., "Post-Filtering Methods for Reducing Blocking Effects from Coded Images," IEEE Transactions on Consumer electronics, vol. 40. No. 3, Aug. 1994, pp. 521-526.

(Continued)

*Primary Examiner*—Sath V Perungavoor
(74) *Attorney, Agent, or Firm*—Chernoff, Vilhauer, McClung & Stenzel

(57) ABSTRACT

A system for reducing ringing artifacts on an image.

12 Claims, 4 Drawing Sheets

U.S. PATENT DOCUMENTS

Figure 1:
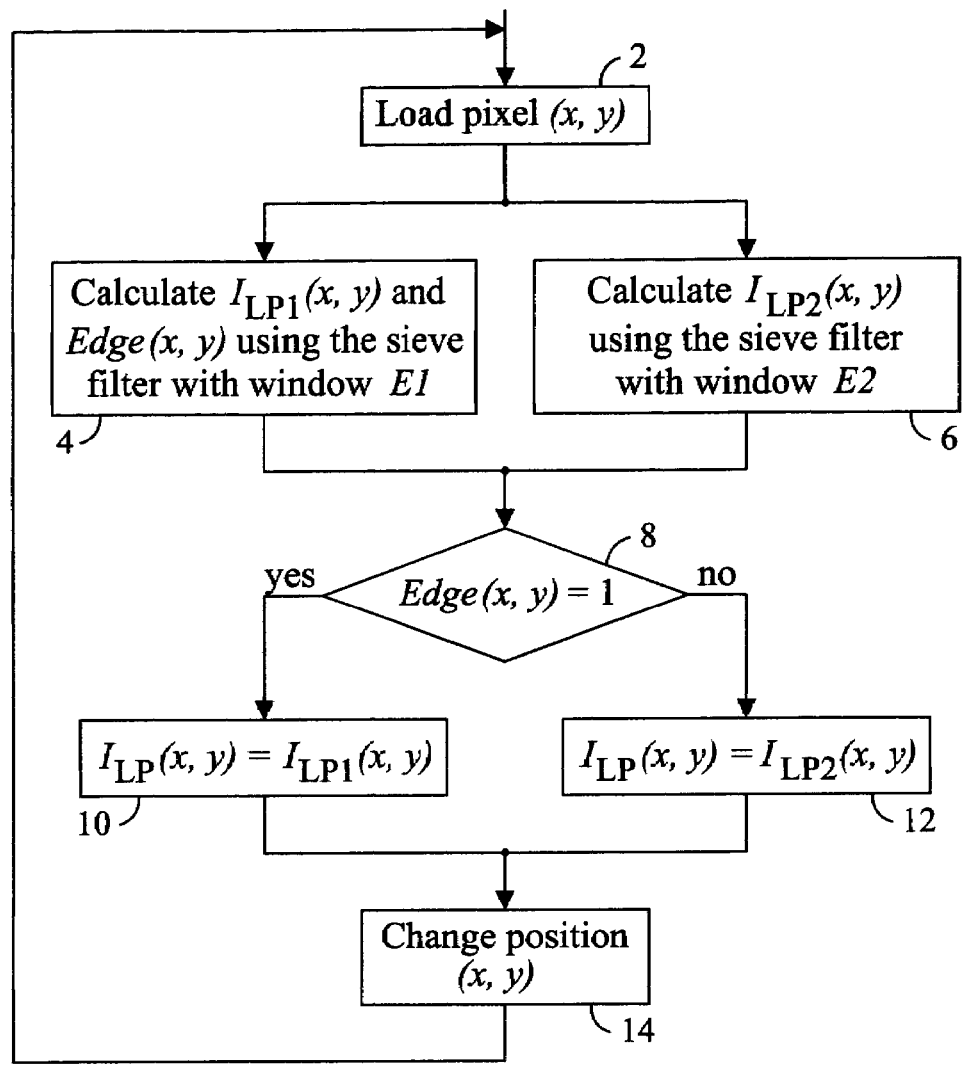

| | | | |
|---|---|---|---|
| 2002/0118399 A1* | 8/2002 | Estevez et al. | 358/426.07 |
| 2002/0122602 A1* | 9/2002 | Rouvellou | 382/261 |
| 2002/0136312 A1 | 9/2002 | Graley | |
| 2002/0159096 A1* | 10/2002 | Sun et al. | 358/3.26 |
| 2002/0191857 A1* | 12/2002 | Macy, Jr. | 382/261 |
| 2003/0020835 A1* | 1/2003 | Petrescu | 348/625 |
| 2003/0021489 A1 | 1/2003 | Miura et al. | |
| 2003/0053708 A1* | 3/2003 | Kryukov et al. | 382/261 |
| 2003/0053711 A1* | 3/2003 | Kim | 382/268 |
| 2003/0081854 A1* | 5/2003 | Deshpande | 382/261 |
| 2003/0219073 A1 | 11/2003 | Lee et al. | |
| 2003/0219074 A1 | 11/2003 | Park et al. | |
| 2004/0022315 A1 | 2/2004 | Park et al. | |
| 2004/0208389 A1* | 10/2004 | Lin | 382/260 |
| 2005/0276505 A1* | 12/2005 | Raveendran | 382/268 |
| 2006/0181740 A1* | 8/2006 | Kim et al. | 358/3.26 |

FOREIGN PATENT DOCUMENTS

| | | |
|---|---|---|
| EP | 1283640 | 2/2003 |
| EP | 1333681 | 8/2003 |
| GB | 2373661 | 9/2002 |
| JP | 02-112387 | 4/1990 |
| JP | 4-321391 | 11/1992 |
| JP | 09-200759 | 7/1997 |
| JP | 2001-320586 | 11/2001 |
| JP | 2002-247414 | 8/2002 |
| JP | 2003-244702 | 8/2003 |
| WO | WO 99/22509 | 5/1999 |
| WO | WO 03/094521 | 11/2003 |

OTHER PUBLICATIONS

Kaup, Andre, "Reduction of ringing Noise in Transform Image Coding Using a Simple Adaptive Filter," Electronics Letters, vol. 34, No. 22, pp. 2110-2112, Oct. 1998.

Segall, C. Andrew and Katsaggelos, Aggelos K., "Pre- and Post-Processing Algorithms for Compressed Video Enhancement," Proc. Of the Asilomar Conference on Signals and Systems, pp. 1369-1373, Oct. 2000.

Yang. Seungjoon, et al., "Maximum-Likelihood Parameter Estimation for Image Ringing-Artifact Removal," IEEE Transactions on circuits and Systems for Video Technology, vol. 11, No. 8, Aug. 2001, pp. 963-973.

Yang. Yongyi, et al. "Removal of Compression Artifacts Using Projections onto Convex Sets and Line Process Modeling" IEEE Transactions on Image Processing, vol. 6, No. 10, Oct. 1997, pp. 1345-1357.

* cited by examiner filtered result of a 1-D sharp edge with
Gaussian noise by the sieve filter The edge proximity map of a 1-D sharp edge
with Gaussian noise by the sieve filter

SYSTEM FOR REDUCING RINGING ARTIFACTS

BACKGROUND OF THE INVENTION

For image coding schemes undesirable ringing artifacts can appear in the decoded images.

Ringing artifacts tend to occur around edges in decoded images that are coded by coding schemes, such as by Joint Photographic Experts Group (JPEG) schemes and Motion Picture Experts Group (MPEG) 1/2/4 schemes. Generally, a sharp edge in the spatial domain spreads energy over nearly the entire spectrum in the frequency domain. In low bit rate Discrete Cosine. Transform Based (DCT-based) coding, however, the high frequency coefficients are either removed or quantized coarsely, resulting in Gibbs phenomena around edges in the spatial domain, which is manifested as ringing artifacts in the decoded images. Ringing artifacts are more complicated for coded image sequences because they are rendered in motion, due to a different ringing pattern for every sequential frame. In coded image sequences (e.g., motion video), the ringing artifacts are often referred to as a "mosquito" or "corona" artifacts.

Generally, a de-ringing technique removes ringing artifacts from images while maintaining the edges and details of images. Many techniques have been developed for de-ringing. These techniques typically fall into two categories: first those that perform processing within the decoding loop of the image decoder; and second those that perform processing after decoding the image.

The techniques in the first category use coding information available in the decoding loop of the image decoder. These techniques are usually based upon information associated with the coding blocks (e.g., DCT coefficients) defined by the coding scheme.

The techniques in the second category use post-processing that is independent of the decoder, and therefore can be implemented independent of the decoder. Without coding information, the post-processing techniques tend to process every pixel. Processing every pixel of the image has much more calculation load than using information contained within coding blocks.

Many post processing algorithms that are sufficiently computationally simple to be implemented in low-cost TV sets use a form of low-pass filter (LPF). Unlike traditional linear LPFs, these modified LPFs preserve sharp edges while reducing ringing artifacts. There are other sophisticated techniques such as those based on principles of maximum a posterior probability estimation (MAP) or projection onto convex sets (POCS), but these are generally not suitable for inexpensive hardware implementations.

Noise reducing techniques can be used for reducing ringing artifacts. These techniques normally do not take into account the characteristics of the ringing artifacts, so their success is somewhat limited.

BRIEF DESCRIPTION OF THE SEVERAL DRAWINGS

Figure 2:
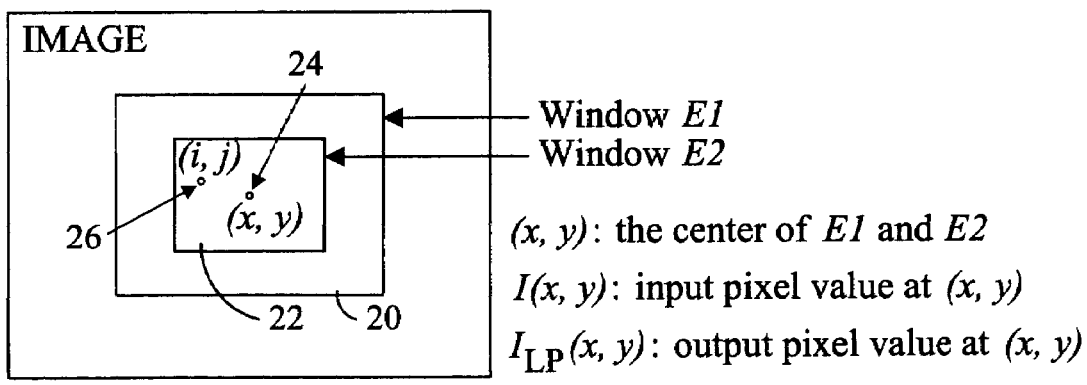
Figure 3A:
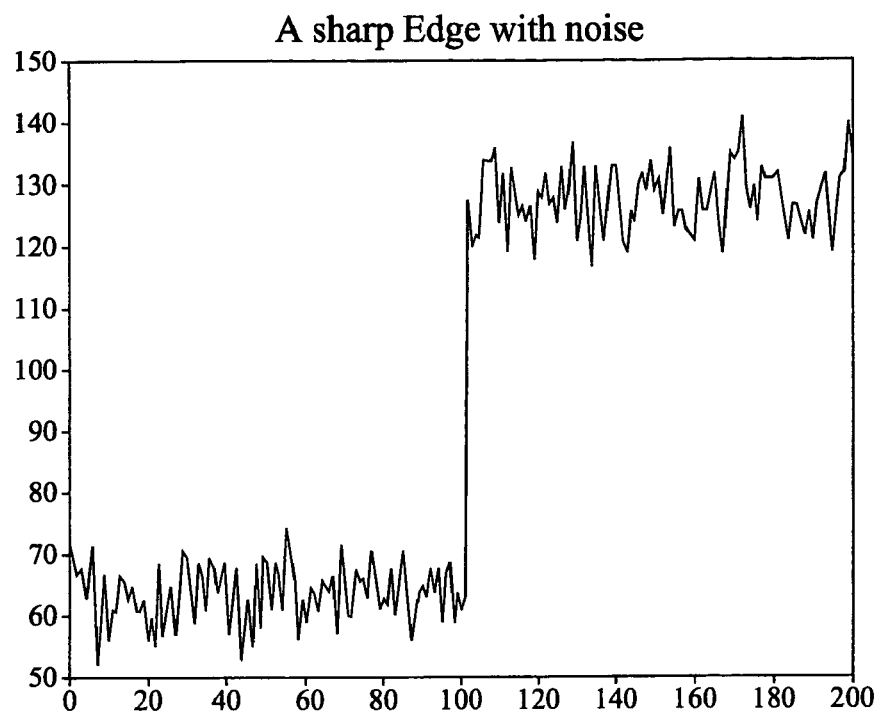
Figure 3B:
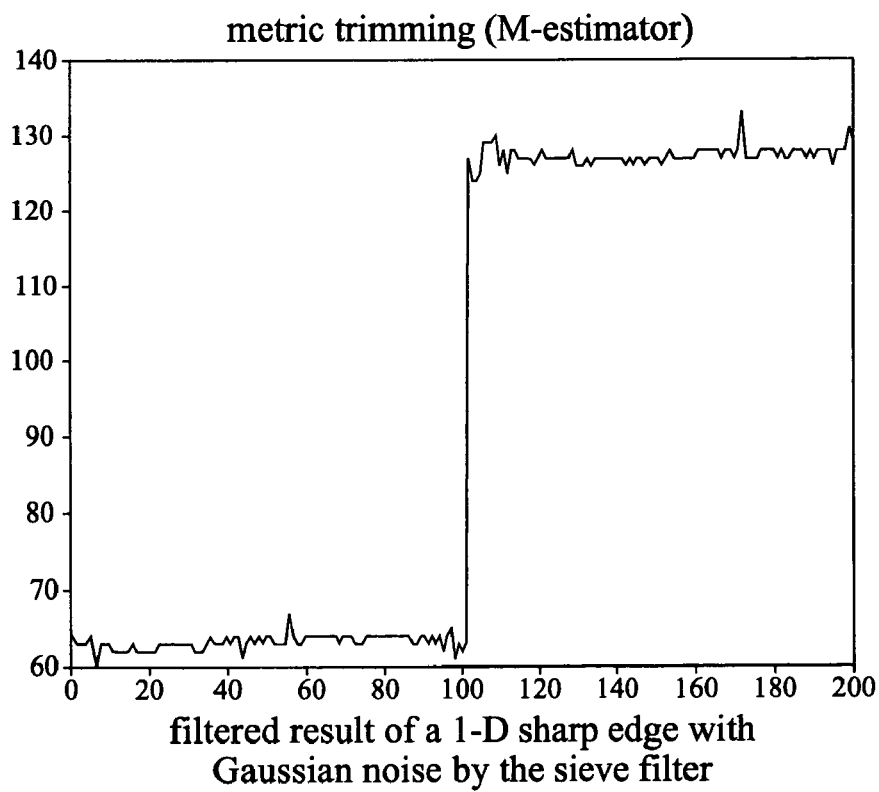
Figure 4:
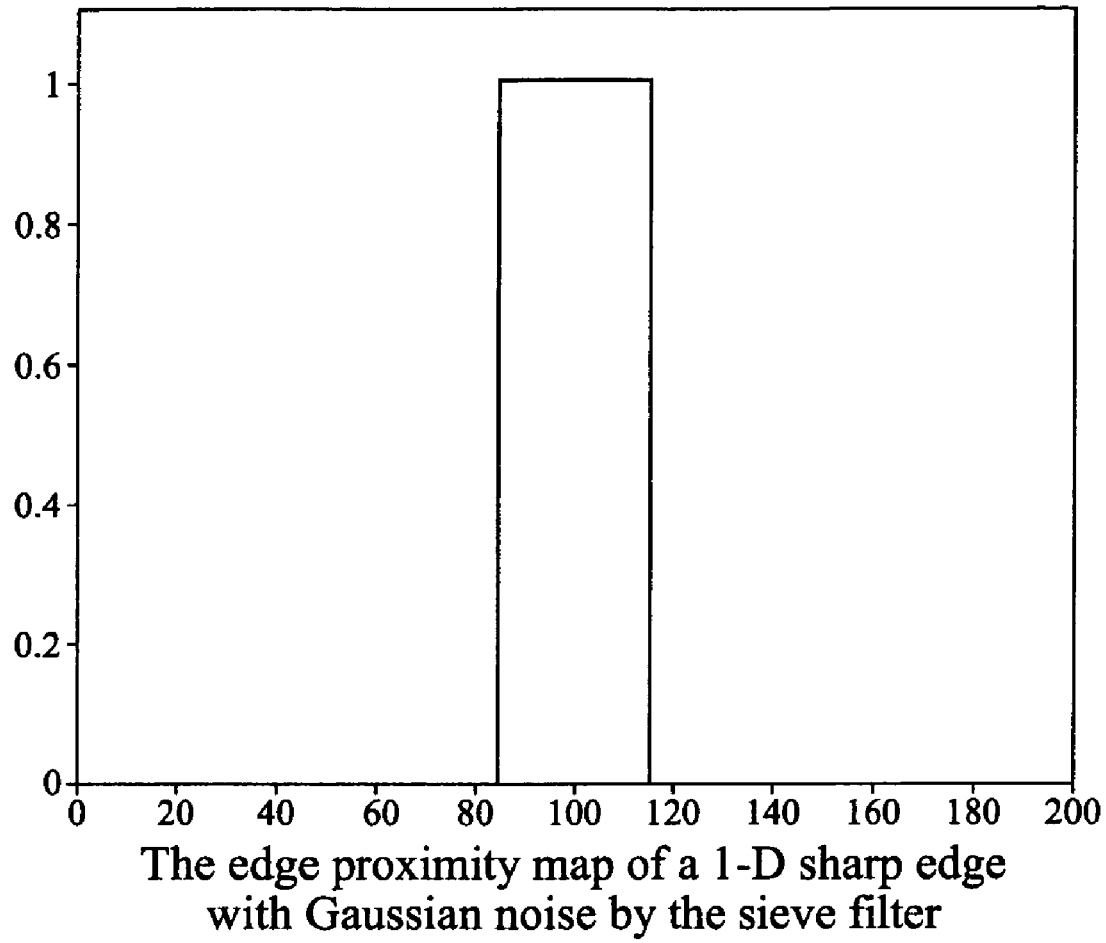
Figure 5:
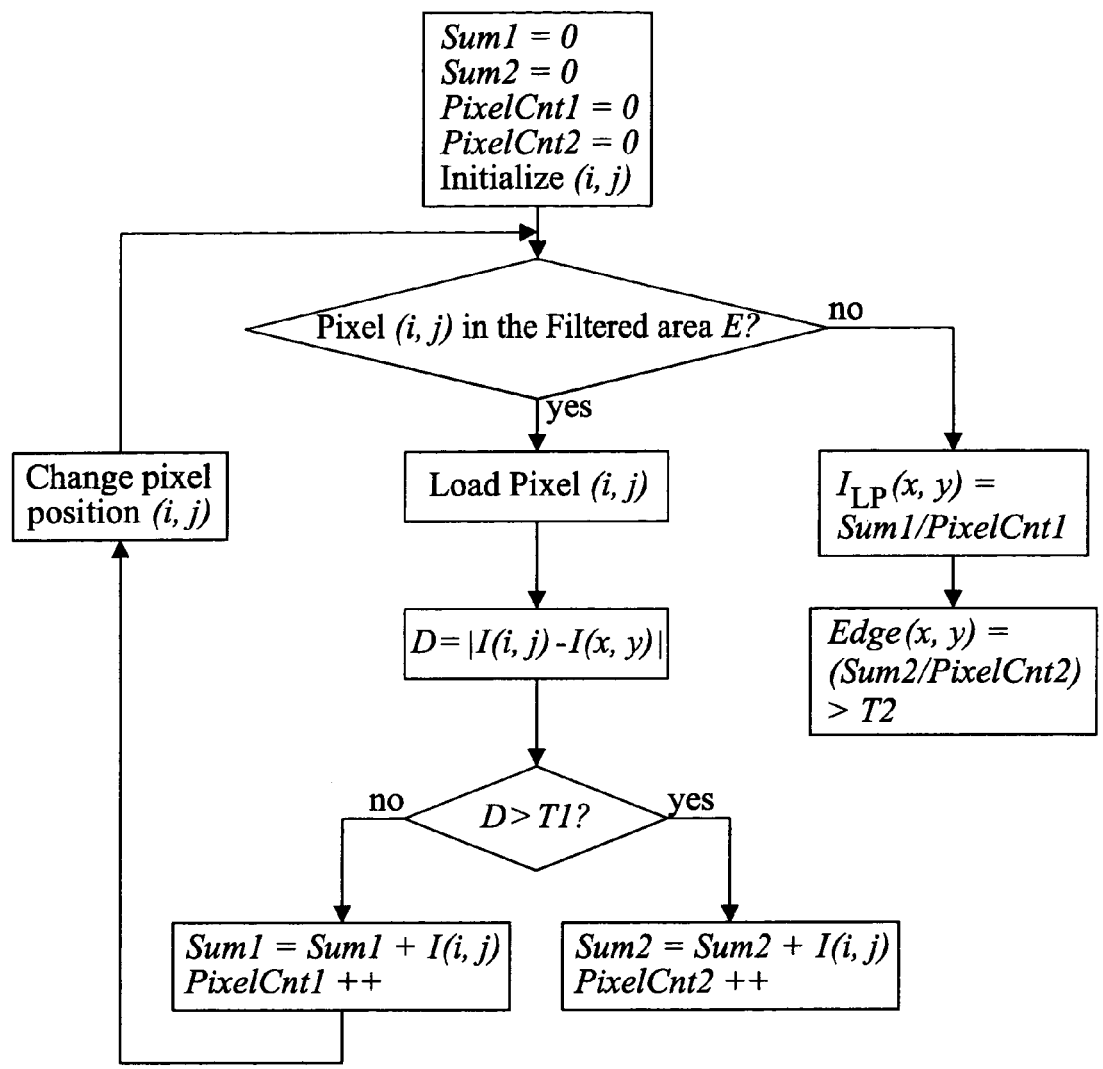

FIG. 1 illustrates a de-ringing technique.
FIG. 2 illustrates a de-ringing technique.
FIG. 3A illustrates a sharp edge with noise.
FIG. 3B illustrates the filtered edge of FIG. 3A.
FIG. 4 illustrates a proximity map.
FIG. 5 illustrates a sieve filter.

DETAILED DESCRIPTION OF PREFERRED EMBODIMENTS

Some embodiments of the present invention may be implemented in LCD TV sets where coding information is not generally available. For this reason, the embodiments described herein normally include post processing techniques.

As previously noted, ringing artifacts are often found around edges in decoded images that are coded at low bit rates by a frequency-based coding scheme, such as JPEG or MPEG-1/2/4. Accordingly, ringing artifacts in decoded images typically have two characteristics. First, ringing artifacts typically occur in the proximity of an edge feature of the image in the spatial domain having a high frequency. Second the present inventor came to the realization that sharper edges are typically accompanied with more serious ringing artifacts. These serious ringing artifacts tend to be stronger, cover larger areas, and are more visible to the human eye.

The design of a de-ringing technique involves a trade-off between removing ringing artifacts from images while preserving the edge details of images. Post-processing techniques may be independent from the image decoder and, therefore, may be implemented in any manner after the decoding. Without coding block information and other coding information resulting from encoding or decoding, the post-processing techniques tend to process every pixel (or a substantial number of pixels). Compared with block-based-processing, pixel-processing typically has more calculation load to process an image. To keep overall computational cost acceptable for inexpensive hardware implementation, the computation for each pixel should be relatively simple.

One of the more difficult challenges in an effective de-ringing technique is to achieve a good balance between artifact reduction and detail-preservation. In this delicate balance, the present inventor has determined that the filter and/or window characteristic in a post-processing filter-based de-ringing algorithm may be used to enhance image quality. In a typical image, with a small-size filter such as a 3×3 filter, it is difficult to totally remove ringing artifacts, although it is relatively easy to preserve detail. On the other hand, with a large-size filter such as a 15×15 filter, it is easier to remove ringing artifacts, although it is more difficult to preserve image detail.

For example, a 3×3 averaging filter may have the strongest smoothing ability among all the 3×3 filters because it only keeps the DC coefficient in the frequency spectrum of the window. Nevertheless, some ringing artifacts are still not reduced by such a 3×3 filter while image details are not fully destroyed. If the averaging filter is expanded to a 15×15 filter, all the ringing artifacts are essentially gone, but so are all the image details.

Another characteristic of ringing artifacts realized by the present inventor is that sharper edges tend to have more serious ringing artifacts. Accordingly, the present inventor realized that some form of adaptation to filter characteristic may be used to better balance ringing artifact reduction and preservation of details. A sharper edge tends to have stronger ringing artifacts in its proximity, so a filter with a larger window more readily removes ringing artifacts while maintaining image detail. More specifically, if a sharper edge is detected within a pixel's proximity, then a filter with a larger window size is applied to this pixel in order to remove the ringing artifacts; and in contrast if a weaker edge is detected, a filter with the smaller size is applied to better preserve details.

The adaptive filter-based de-ringing technique based upon the filter size permits more selective filtering. The window size used by the current technique is usually fixed to a small one. A relatively small window size tends to hinder the ringing-artifact-removing ability of a de-ringing algorithm, while a relatively large window size tends to hinder the detail-preserving ability of a de-ringing algorithm. The present inventor has determined that a desirable de-ringing algorithm should have its window size (or otherwise the characteristics of the filter) adaptive to the sharpness of edges (e.g., strength of intensity transitions). Some embodiments of the present invention embody a de-ringing algorithm that adaptively uses multiple window sizes in order to achieve a balance between reducing ringing artifacts from images and preserving details of images. In some embodiments, two window sizes are used. Selecting the window size may be automatically performed based on detected edge information.

Some embodiments of the present invention may include a technique that uses a nonlinear low-pass sieve filter. This filter preserves sharp edges, reduces ringing artifacts, and also detects the proximity of an edge.

Some exemplary embodiments of the present invention may be described with reference to FIG. 1. In these embodiments, a filter is applied to a pixel at position (x,y) 2 using two window sizes: E1 (e. g., 15×15) 4 and E2 (e. g., 3×3) 6. Other window sizes or number of windows may be used, as desired. For the bigger window E1, the filter plays two roles: low-pass filtering images (without destroying strong edges) to generate $I_{LP1}(x,y)$, and generating a binary decision Edge(x,y), which indicates whether the pixel is proximate to a sharp edge. The nearness of the proximity is defined by the size of E1. For the smaller window E2, the filter may only low-pass filter the image (without destroying strong edges) and generate $I_{LP2}(x,y)$, without generating a binary decision on edge. Compared with $I_{LP2}(x,y)$, $I_{LP1}(x,y)$ has fewer ringing artifact remnants, but preserves fewer details as well. Other filters may like be used.

In a subsequent step, the filtered intensity $I_{LP}(x,y)$ at position (x,y), is chosen from $I_{LP1}(x,y)$ 10 and $I_{LP2}(x,y)$ 12, depending on Edge(x,y) 8. If Edge(x,y)=1, then the pixel is in the proximity of a sharp edge (i.e., within window E1 of the pixel at (x,y), there is at least one sharp edge). Based on stronger ringing artifacts being associated with sharper edges, $I_{LP1}(x,y)$ 10 is chosen as the final result because $I_{LP1}(x,y)$ 10 is obtained from a big window and has been smoothed strongly. If Edge(x,y)=0, within window E1, there is no sharp edge. Therefore, $I_{LP2}(x,y)$ 12 is chosen because $I_{LP2}(x,y)$ 12 is from a small window and contains more details.

Some embodiments of the present invention include a sieve filter. These embodiments may be explained with reference to FIG. 2. As previously mentioned, the sieve filter may have two functionalities: edge-preserving smoothing and edge proximity detection (determining if a pixel is in the proximity of an edge).

The sieve filter of some embodiments of the present invention may comprise a 1-D or 2-D rectangular window E 20 and 22, where the current pixel, I(x,y) 24, is located at the center of the window. All the pixels I(i,j) 26 within the windows E 20 and 22 are compared with the central pixel I(x,y) 24. All the pixels whose differences with I(x,y) are smaller than a threshold T1 are averaged. The output of an exemplary sieve filter, $I_{LP}(x,y)$, may be represented mathematically by $$I_{LP}(x, y) = \frac{\sum_{(i,j) \in E \& |I(i,j)-I(x,y)|<T1} I(i, j)}{N(x, y)} \quad (1)$$

where E is the window; N(x,y) is the count of the pixels in E that satisfy the condition of |I(i,j)−I(x,y)|<T1.

The sieve filter can smooth data while preserving sharp edges. If the amplitude of an edge is over a threshold value, T1, the edge will be preserved while other places are smoothed. Whether an edge is sharp or not is also determined by T1.

In some embodiments, the sieve filter can also determine if pixel I(x,y) is within the proximity of a sharp edge, where the proximity is determined by the window sizes E 20 and 22. Specifically, the values of the pixels that are dropped by a threshold T1 are averaged and compared with another threshold, a threshold T2. If this average is bigger than T2, then pixel I(x,y) may be determined to be in the proximity of a sharp edge and Edge(x,y)=1; otherwise, Edge(x,y)=0. Mathematically, the output of an exemplary sieve filter Edge(x,y) used in some embodiments is represented by $$\text{Edge}(x, y) = \frac{\sum_{(i,j) \in E \& |I(i,j)-I(x,y)| \geq T1} I(i, j)}{N - N(x, y)} > T2$$

where N is the total number of pixels in window E.

Because this filter drops pixels and keep some pixels for averaging, one may refer to this filter as a sieve filter. Because a sieve filter cannot satisfy the conditions of a linear filter, the sieve filter is considered nonlinear. The two thresholds T1 and T2 and the window size E may be preset to fixed values, determined by calculation of image parameters, or otherwise determined automatically.

The edge-preserving and smoothing functionality of an exemplary sieve filter is illustrated by example in FIGS. 3A and 3B. FIG. 3A shows the input of the sieve filter with a sharp edge which is corrupted with Gaussian type noise. FIG. 3B shows the filtered result of the sieve filter. Because T1 is chosen smaller than the edge amplitude but bigger than the highest fluctuation caused by the noise, the sieve filter effectively smoothes the signal while preserving the sharp edge.

The edge proximity detection functionality of the sieve filter may be illustrated with reference to FIG. 4. The input of the sieve filter is still the sharp edge with Gaussian noise shown in FIG. 3A where the edge is at position 100. As shown in FIG. 4, an area surrounding position 100, not one position, is detected as the proximity of the edge and set to 1. This result is good for the proposed de-ringing algorithm, because the proposed de-ringing algorithm wants to know what pixels are close to a sharp edge, not just the position of an edge.

The computational resource requirements for this filter are minimal.

The sieve filter essentially is an averaging filter, but only averages those pixels whose values differ from the central pixel I(x,y) by an amount within a threshold value, T1. In exemplary embodiments, this computation requires only two divisions, one for $I_{LP}(x,y)$ and one for Edge(x,y).

An exemplary flow diagram for one type of sieve filter is illustrated in FIG. 5. The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

The invention claimed is:

1. A computer implemented method for reducing ringing artifacts in an image comprising:
   (a) identifying a pixel in an image;
   (b) determining the proximity of said pixel to an edge feature in said image using a non-linear low-pass sieve filter that modifies said pixel using information from only those selective ones, among all those neighboring pixels within a defined two-dimensional window around said pixel, that meet a criteria defined by said sieve filter; and
   (c) based upon the distance of said pixel from said edge feature, modifying said pixel with either a first filter or a second filter based upon the distance of said pixel from said edge feature.

2. The method of claim 1 wherein said first filter is said non-linear low-pass sieve filter having a first pixel window.

3. The method of claim 2 wherein said second filter is said non-linear, low-pass sieve filter having a second pixel window with a different size than said first pixel window.

4. The method of claim 3 wherein said non-linear low-pass sieve filter detects the proximity of said pixel to said edge feature uses said first pixel window and said second pixel window.

5. The method of claim 4 wherein said first pixel window has an area of 15×15 pixels.

6. The method of claim 5 wherein said second pixel window has an area 3×3 pixels.

7. A computer implemented method for reducing ringing artifacts in an image, comprising:
   (a) filtering pixels of said image that are sufficiently proximate an edge feature using a first filter applied to a two-dimensional first area of pixels centered around a target pixel, where said first filter modifies said target pixel using information from only those selective ones, among all those neighboring pixels within a defined two-dimensional window around said target pixel, that meet a criteria defined by said first filter;
   (b) filtering pixels of said image that are not sufficiently proximate said edge feature using a second filter applied to a two-dimensional second area of pixels centered around a target pixel, said second area including a number of pixels different than that of said first area; and wherein said first filter determines whether said pixels are proximate to said edge feature.

8. A computer implemented method for filtering an image, comprising:
   (a) identifying a pixel in said image;
   (b) determining at least one of a sharpness of an edge feature in said image and a proximity of said pixel to said edge feature using a sieve filter that modifies said pixel using information from only those selective ones, among all those neighboring pixels within a defined two-dimensional window around said pixel, that meet a criteria defined by said sieve filter;
   (c) based upon at least one of a determined said sharpness and a determined said proximity, filtering said pixel with either a first two-dimensional filter or a second two-dimensional filter, where at least one dimension of said first filter is at least 15 pixels in length.

9. A computer implemented method for filtering an image comprising:
   (a) identifying a pixel in an image;
   (b) measuring the proximity of said pixel to an edge feature with a first non-linear low pass filter, using the equation $$\text{Edge}(x, y) = \frac{\sum_{(i,j) \in E \& |I(i,j)-I(x,y)| \geq T1} I(i, j)}{N - N(x, y)} > T2,$$

where N is the total number of pixels in the window E;
   (c) measuring the sharpness of said edge feature;
   (d) filtering said pixel with said first sieve filter when said proximity and said sharpness satisfy a criterion; and
   (e) filtering said pixel with a second non-linear low-pass sieve filter when said proximity and said sharpness do not satisfy said criterion, said second sieve filter applied over a pixel window of a different size than that over which said first sieve filter is applied.

10. A computer implemented method for filtering ringing artifacts from an image, said method comprising:
    (a) identifying a pixel in an image;
    (b) filtering said pixel with a non-linear low-pass sieve filter with a first window size to determine an edge proximity value, where said sieve filter modifies said pixel using information from only those selective ones, among all those neighboring pixels within a defined two-dimensional window around said pixel, that meet a criteria defined by said sieve filter;
    (c) using said filter with a first window size to determine a first filtered pixel value for said identified pixel;
    (d) using a non-linear low-pass sieve filter with a second window size to determine a second filtered pixel value for said identified pixel;
    (e) replacing said identified pixel with said first filtered pixel value when said edge proximity value meets a criterion; and
    (f) replacing said identified pixel with said second filtered pixel value when said edge proximity value does not meet said criterion.

11. The method of claim 10 wherein said edge proximity value is determined by the equation:

$$\text{Edge}(x, y) = \frac{\sum_{(i,j) \in E \& |I(i,j)-I(x,y)| \geq T1} I(i, j)}{N - N(x, y)} > T2$$

where N is the total number of pixels in the window E.

12. The method of claim 10 wherein said first filtered pixel value is determined by the equation:

$$I_{LP}(x, y) = \frac{\sum_{(i,j) \in E \& |I(i,j)-I(x,y)| < T1} I(i, j)}{N(x, y)}$$

where E is the window; N(x,y) is the count of the pixels in E that satisfy the condition of |I(i,j)−I(x,y)|<T1.

* * * * *